Aug. 26, 1958 G. NEESE 2,848,791
METHOD OF MAKING CAGES FOR ROLLER OR NEEDLE BEARINGS
Filed Dec. 27, 1954

Inventor
GERHARD NEESE
By Shoemaker + Mattare
Attorneys

United States Patent Office 2,848,791
Patented Aug. 26, 1958

2,848,791

METHOD OF MAKING CAGES FOR ROLLER OR NEEDLE BEARINGS

Gerhard Neese, Bielefeld, Germany, assignor to Dürkoppwerke Aktiengesellschaft, Bielefeld, Germany, a corporation of Germany Application December 27, 1954, Serial No. 477,845

Claims priority, application Germany January 11, 1954

1 Claim. (Cl. 29—148.4)

This invention relates to a roller cage for cylindrical rollers or needle rollers which are held individually in cage pockets and are thereby guided paraxially.

In my co-pending application No. 396,996 filed December 8, 1953, I have shown a roller cage which consists of an annular sheet metal or turned body of almost U-shaped cross section which after stamping out of the cage pockets received its final somewhat W-shaped cross section in consequence of the bending of the cross pieces between the pockets. The individual cross pieces of the cage, between said pockets, and connecting the two end flanges of the cage, serve partly for the holding of the rollers radially of the bearing and partly for guiding the rollers paraxially.

The present invention has for an object to provide an improved method of manufacture for these roller cages and aims at improving the product from the point of view of its dimensional accuracy and consistency.

According to the invention, a cage ring of somewhat W- or M-shaped cross section is first made, as by turning or profile rolling a blank to the required cross section and, such ring is then stamped or punched with a tool shaped to correspond with said cross section, for the formation of the cage pockets.

Normally the turned or rolled workpiece will be mounted for rotation and moved step by step, as by a dividing head, for the stamping out of the pockets in succession.

The tool is shaped transversely so that, at those parts of the cage which are inclined to the main axis of the cage, the pockets are of greater width so as to accommodate the full diameter of the roller.

The invention is illustrated in the accompanying drawing, wherein:

Fig. 3a is a plan of a section of the cage ring formed according to Fig. 2a.

Fig. 4a is a cross section in a plane perpendicular to the axis on the line A—B of Fig. 3a.

Figure 4A:
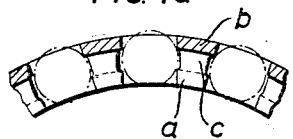
Figure 4B:
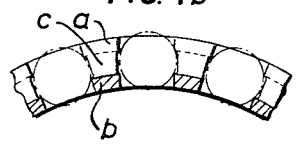
Fig. 4b is a cross section in a plane perpendicular to the axis on line A'—B' of Fig. 3b.

The improved roller cage, which is especially suitable for the holding of particularly thin needle rollers, resembles than set forth in the said earlier application No. 396,996 and has two side flanges 1 which are connected to one another by cross pieces 2 distributed uniformly around the periphery of the cage. The cross pieces 2 are formed with different widths at different positions. There are end portions $a$ of the cross pieces having their edges running parallel to the main axis of the cage and the middle portions $b$ of the cross pieces likewise having their edges running parallel to the main axis of the cage, and these respective edges form holding zones for the rollers, some above and some below the rollers, see Figs. 4a and 4b. Between the parts $a$ and $b$ of the cross pieces 2 are the portions $c$, whose edges are in planes parallel to those containing the edges of the portions $a$ and $b$, whilst the portions $c$ are themselves inclined to the portions $a$ and $b$, see Figs. 2a and 2b.

According to this invention, the cage ring is produced in the final somewhat W- or M-shaped axial section as a profile ring by turning from a blank of the required thickness or by profile rolling of a suitable blank. In the circumferential part of the turned or rolled workpiece, that is, in the part between the ring flanges 1, cage pockets 4 are then stamped individually by means of a reciprocating profile stamp or punch 5. For this purpose the turned or rolled workpiece is mounted in an arrangement (not shown) by which it is rotated step by step, as by means of a dividing head, to bring successive portions below the tool 5.

Figure 1A:
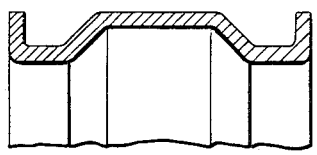
Fig. 1a is a section in an axial plane through the profiled cage ring in which the section is substantially of W-shape.
Figure 1B:
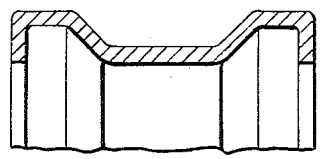
Fig. 1b is a like view of an alternative ring in which the section is reversed and is substantially of M-shape.
Figure 2A:
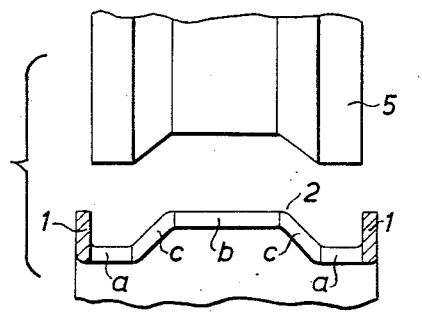
Fig. 2a shows a section through the cage ring according to Fig. 1a after the stamping out of the cage pockets, and shows also the operative end of the stamping tool.
Figure 2B:
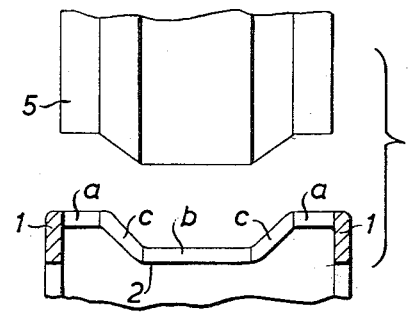
Fig. 2b is a like view to Fig. 2a but relating to the cage ring of Fig. 1b.
Figure 3A:
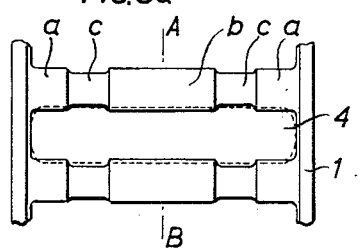
Figure 3B:
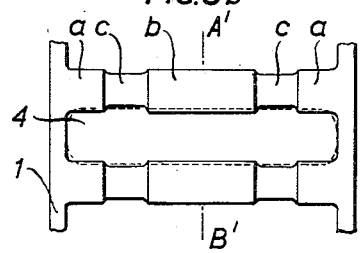
Fig. 3b is a similar plan of a ring formed according to Fig. 2b.

The profile stamp 5 is shaped at its operative end corresponding to the axial section of the workpiece to be punched, see Figs. 2a and 2b, and in plan it is shaped so that in the area of the cross piece portions $c$, which are inclined to the main axis of the cage, it is somewhat widened to give room for the rollers which can thereby rotate easily in the pockets. The width of the pockets 4 in the area of the cross piece portions $a$ and $b$, which are parallel to the main axis of the cage, is a little smaller than the roller diameter so that a roller, after being sprung into the cage pocket, cannot fall out. In Figs. 3a and 3b, the roller is indicated in broken lines.

In the embodiment according to Figs. 1a to 4a, the portions $b$ of the cross pieces 2 are outermost and retain the rollers at the outer diameter of the bearing, whilst the portions $a$ of the cross pieces are innermost and retain the rollers at the inner diameter of the bearing. In the alternative arrangement according to Figs 1b to 4b the reverse is the case.

The latter arrangement has the advantage that, whereas in the former case only the flanges 1 serve to locate the cage against the outer bearing race, in Figs. 1b to 4b a considerably wider locating surface is provided by the portions $a$ of the cross pieces 2, and thus a better guiding effect is guaranteed.

A better dimensioning of the roller cage manufactured in accordance with the process according to this invention is obtained, the rollers not being guided exactly paraxially that is, they run obliquely and jam.

What I claim is:

The method of forming a roller cage for a roller or needle bearing, said method comprising first forming a cylindrical blank exhibiting in longitudinal section parallel end flanges perpendicular to the cylinder axis and joining aligned longitudinal end portions which are in turn joined to a longer intermediate portion by angular portions oblique to said axis and the imparting step-by-step rotary motion to said cylindrical blank turning on its longitudinal axis to bring successive areas of the blank into position relative to a stamping tool corresponding in contour to the longitudinal sectional contour of the portion of the blank lying between the said end flanges and shaped to form an opening having a greater width in the parts thereof formed through the said angular portions than in the parts thereof formed through the said end and intermediate portions, and then by successive operations timed to the step-by-step rotary movement of the blank punching the portions of the blank lying between the said end flanges to form the said roller pockets.

References Cited in the file of this patent

UNITED STATES PATENTS

| | | |
|---|---|---|
| 1,173,719 | Hirth | Feb. 29, 1916 |
| 1,320,096 | Rouanet | Oct. 28, 1919 |
| 1,395,244 | André | Nov. 1, 1921 |
| 1,443,340 | Blomberg | Jan. 30, 1923 |
| 1,712,286 | Witherow | May 7, 1929 |
| 1,960,385 | Lofgren | May 29, 1934 |